United States Patent [19]

Seaman et al.

[11] 4,382,024

[45] May 3, 1983

[54] ELECTRICALLY CONDUCTIVE RUBBER

[75] Inventors: Peter H. Seaman; Frederick W. Bloore, both of Wolverhampton, England

[73] Assignee: Hotfoil Limited, Wolverhampton, England

[21] Appl. No.: 103,563

[22] Filed: Dec. 14, 1979

Related U.S. Application Data

[63] Continuation-in-part of Ser. No. 907,415, May 18, 1978, abandoned.

[30] Foreign Application Priority Data

May 18, 1977 [GB] United Kingdom ............... 20821/77
May 18, 1978 [CA] Canada .................................. 303591
May 18, 1978 [FR] France ................................. 78 14791

[51] Int. Cl.$^3$ ............................................. H01B 1/06
[52] U.S. Cl. .................................... 252/511; 252/503; 252/506; 252/507; 252/509; 252/508
[58] Field of Search ............... 252/503, 506, 507, 505, 252/509, 511, 508, 907, 115; 524/588, 495, 492, 497, 425, 432, 435, 437, 439; 106/307

[56] References Cited

U.S. PATENT DOCUMENTS

| | | | |
|---|---|---|---|
| 2,436,306 | 2/1948 | Johnson | 252/511 |
| 2,526,059 | 10/1950 | Zabel | 252/511 |
| 3,099,578 | 7/1963 | Hunter | 252/503 |
| 3,385,959 | 5/1968 | Ames et al. | 252/511 |
| 3,742,423 | 6/1973 | Chadwick | 252/511 |
| 4,035,336 | 7/1977 | Jordan et al. | 524/495 |
| 4,051,454 | 9/1977 | Leiser et al. | 252/511 |
| 4,071,496 | 1/1978 | Kraus et al. | 524/495 |
| 4,273,697 | 7/1981 | Sumimura et al. | 252/511 |

FOREIGN PATENT DOCUMENTS 957108  5/1964  United Kingdom ................ 252/511

*Primary Examiner*—J. L. Barr
*Attorney, Agent, or Firm*—Holman & Stern

[57] ABSTRACT

An electrically conductive silicone rubber composition having a positive, non-linear, temperature coefficient of resistance and which is substantially non-conductive at a temperature above a predetermined transition temperature, the composition comprising up to 25% based on total material weight of conducting carbon black, from 29% to 62% based on total material weight of at least one additive having a particle size between 0.005 microns and 100 microns, being compatible with the rubber, and having a melting point above the curing temperature of the rubber.

11 Claims, 1 Drawing Figure

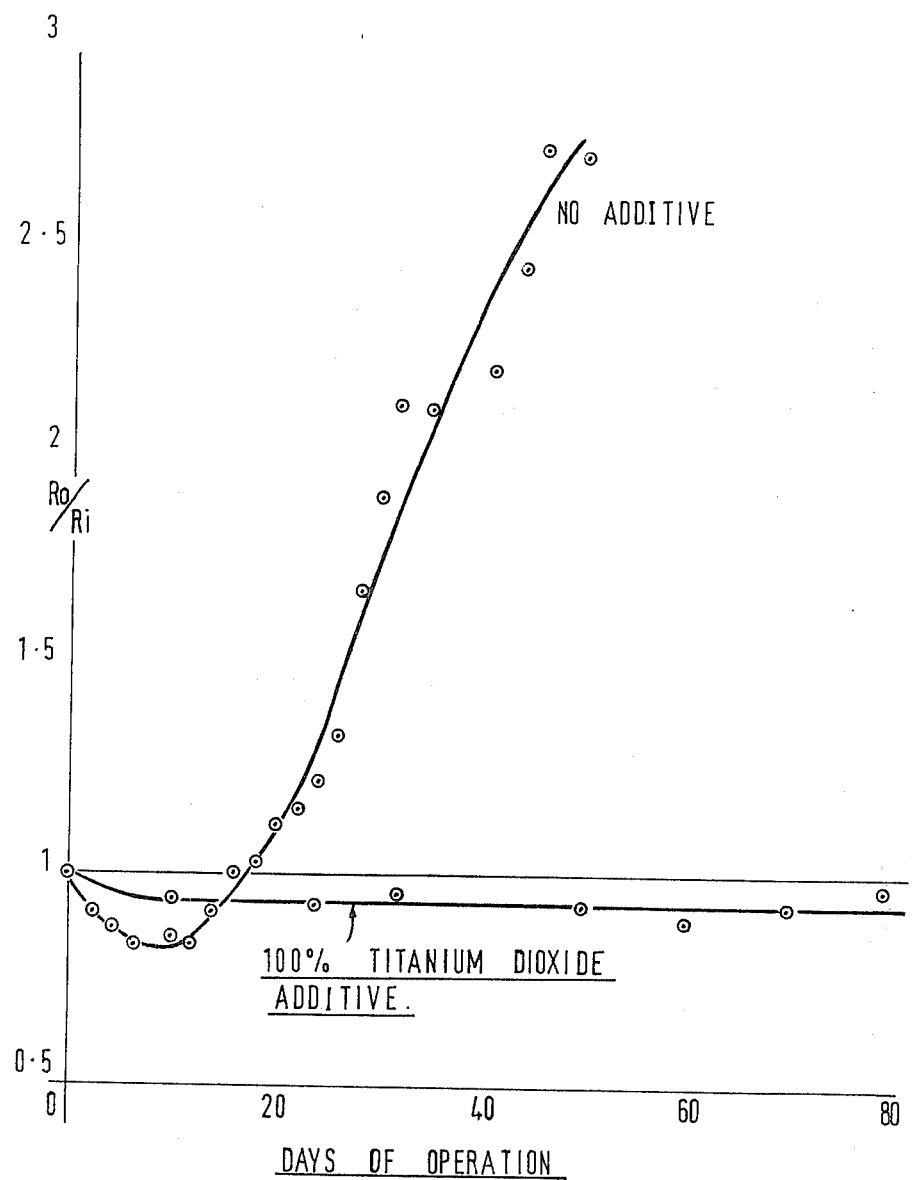

ELECTRICALLY CONDUCTIVE RUBBER

This is a continuation in part of application Ser. No. 907,415 filed May 18, 1978, now abandoned.

BACKGROUND OF THE INVENTION

1. Field of the Invention

This invention relates to an electrically conductive silicone rubber composition and to heating elements made therefrom such as heating tapes and sheets.

It is desired that heating elements are made from a composition having a positive temperature co-efficient of resistance (PTC) of such characteristic that above a predetermined temperature a substantial increase in resistance occurs. As a result, the heating elements are self-limiting in that when the temperature of the element increases above a certain temperature its resistance increases with the result that less current flows with consequent reduction in heat output and hence further increase in temperatures does not occur. A steady state is reached at which the heat produced by the element is balanced by the heat lost by the element.

2. Description of the Prior Art

It has been proposed to use electrically conductive silicone rubber compositions in the manufacture of heating elements such as tapes. For example, in U.K. Patent Specification No. 957,108 it is proposed to utilise, in the manufacture of heating elements, an electrically conductive silicone rubber composition comprising 15% to 48% of carbon black, 4% to 14% of filler, up to 7% of peroxide curing agent and, optionally, up to 7% of structure control additive, the balance being silicone gum. The above mentioned percentages are expressed in terms of weight based on the total material weight. The filler is provided solely to achieve desired mechanical properties such as strength and/or viscosity. Such a composition has not found general acceptance in the manufacture of heating elements because the composition has a PTC of such characteristic that no effective self-limiting effect is achieved in the heating elements made from the material; because the material has a relatively low stability i.e. a relatively high change in conductivity during storage prior to use, a relatively short life i.e. a relatively high change in conductivity during use, further the initial current on switching on the heating element is relatively high which leads to the need to provide switch gear, wiring, fuses etc. capable of withstanding the high switch-on current and because it is difficult to achieve, and to maintain in production, a predetermined and uniform conductivity.

SUMMARY OF THE INVENTION

Accordingly, objects of the present invention are to provide a new and improved electrically conductive silicone rubber composition which has a positive, non-linear temperature co-efficient of resistance and which is effectively non-conductive at a temperature above a predetermined temperature and having an electrical conductivity which does not substantially vary time during storage or service and has a relatively low switch-on current.

According to the present invention we provide an electrically conductive silicone rubber composition having a positive, non-linear, temperature co-efficient of resistance and which is effectively non-conductive at a temperature above a predetermined temperature, the composition comprising up to 25%, based on total material weight of conducting carbon black, from 29% to 62% based on total material weight of at least one additive having a particle size between 0.005 microns and 100 microns, being compatible with the rubber, and having a melting point above the curing temperature of the rubber.

There may be at least 5% of the carbon black based on total material weight.

For many applications, particularly as a heating tape, up to 14% carbon black, based on total material weight, is adequate.

There may be up to 8.7% of the carbon black based on total material weight.

There may be at least 35% of at least one additive, based on total material weight.

There may be between 40% and 55% of at least one additive, based on total material weight.

The additive particle size may be between 0.01 microns and 10 microns.

The additives may be non-electrically conductive and have a melting point above 400° C.

Alternatively, the additives may be metal particles having a melting point above 400° C.

The carbon black may be sulphur-free and it is preferred to use carbon black manufactured from acetylene such as that produced by the Shawinigan Company. Alternatively, Ketjenblack EC (made by Akzo Chemie Nederland by Nieuwendammerkade, 1-3 P.O. Box No. 15, Amsterdam-N) may be used, or any other carbon black or a combination of blacks.

The silicone rubber may be an approximate 50/50 mixture of two silicone rubbers produced by Dow Corning Limited and known as Q41602 and X42638 rubbers which comprise dimethyl vinyl siloxane incorporating 55% of Shawinigan carbon black with a platinum catalyst. The precise proportion of the rubbers is adjusted so that the final material has a desired conductivity by taking samples and adding more of one of the rubbers to adjust the conductivity.

Other rubbers may be used such as ICI E315/50 in which case 20% (based on the weight of rubber) of Shawinigan carbon black and a curing agent comprising 4% of Di-cumyl peroxide such as Dicup 40C (based on the weight of rubber) made by Hercules Powder Company of Wilmington, Delaware, U.S.A. can be provided. ICI E315/50 rubber comprises a methyl vinyl polysiloxane and contains, as supplied by ICI, 28% fumed silica additive together with 1-2% of structure control additive and the percentage contents referred to above are in relation to the weight of the rubber, including additive, as supplied. Alternatively, ICI rubber E303 with 6% (based on weight of rubber) of Ketjenblack EC and 4% Dicup (based on weight of rubber). ICI 303 rubber comprises a methyl vinyl polysiloxane.

The additives may comprise one or more of the following:

Titanium dioxide
Silica
Zinc oxide
Precipitated calcium carbonate
Zirconium silicate
Aluminium oxide
Barium titanate
Copper
Aluminium
Nickel
Iron or other metals.

All the above additives are what is known to those skilled in the art as "compatible" with silicone rubber and any other compatible material having a melting point above the curing temperature of the rubber and having a particle size between 0.005 microns and 100 microns may be used. By compatible we mean, interalia, that the uncured silicone rubber must wet the additive particles; the cohesive energy between the rubber and the particles must be greater than that between particles and the particles must not affect the curing of the rubber.

A silicone rubber composition embodying the present invention has the following properties:

It has a positive, non-linear, temperature co-efficient of resistance and is effectively non-conductive at a temperature above a predetermined temperature;

Compared with silicone rubber compositions containing no additives or known silicone rubber compositions containing additives such as that disclosed in U.K. Patent Specification No. 957,108 it has the following advantageous features:

a better stability, that is to say the composition has a lower rate of increase in electrical conductivity during storage prior to use;

a better lifetime, that is to say the composition has a lower rate of decrease in electrical conductivity during use, thus the time taken for the composition to reach a predetermined minimum conductivity during use is increased;

the ratio of the switch-on current to the operating current is lower;

the handleability of the material during manufacture is improved since the addition reduces the stickiness of the material and at the same time the reduction in conductivity caused by introduction of the addition is relatively small;

the electrical properties of the composition are reproducible in that different batches of the material which are of the same composition have substantially the same electrical properties.

Further, we have unexpectedly found that, although there is some decrease in conductivity when additives in the above specified amounts are present, a predetermined conductivity of the material can be maintained by adding a very small extra amount of carbon, even when the metal contains 62% of additive based on total material weight. Preferably we provide at least 35% of additive, based on total material weight, since in tests, where the additive was FeO and ZnO, a significant improvement in lifetime was achieved with 35% or more, up to said 62%, of additive. Further unexpectedly we have found the addition of powdered metals, surprisingly, similarly reduces the conductivity of the rubber. For example, in the case of an addition of 100%, (based on the weight of silicone gum) of atomised copper or aluminium powder to a conducting silicone rubber such as ICI with 20% (based on the weight of rubber) Shawinigan carbon black reduces the conductivity of the resultant mixture by a factor of between 5 to 10 times but the conductivity can be reached by the addition of only about an extra 2% of carbon based on the weight of the carbon originally present.

A preferred additive is titanium dioxide and it is preferred that between 90% and 130% of additive is present based on the silicone gum content. It has been found that the rubber may contain up to 200% titanium dioxide and perform satisfactorily although the material is somewhat brittle, even though the addition of about 10% extra silicone rubber to the mixture if the titanium dioxide were not added, would have made the mixture non-conducting.

One use of a silicone rubber composition embodying the present invention is as a heating tape but it should be appreciated that if desired the rubber composition may be used to make other heating articles and could be made by other means such as moulding instead of by extrusion.

According to a further aspect of the present invention, we provide an electrically resistive article having a positive, non-linear temperature co-efficient of resistance comprising at least one electrode embedded in a body comprising a silicone rubber composition embodying the first aspect of the invention.

Preferably, the article is in the form of an elongate tape having a pair of spaced parallel elongate electrodes extending longitudinally of the tape.

The tape may be from 10 to 30 mm in overall width and 1 to 5 mm in overall thickness and of indefinite length.

The tape may be 15 mm wide and 2.4 mm thick.

The material may be post cured by heating in an oven for 2 to 12, preferably 2 hours, at 100° to 250° C., preferably 150° C., and then at a temperature in the range 100° to 250° C., preferably 200°–250° C., for a further 2 to 8 hours, preferably 2 hours. In the case of a heating tape an outer sheath of non-conducting silicone rubber is then applied to the tape and the thus sheathed tape is heated to 150° to 350° C., preferably 300° C., for 3 to 5 minutes, preferably 3 minutes to cure the outer sheath. If desired, other material such as a thermo-setting or thermoplastics material may be used to sheat the tape with an appropriate curing operation as necessary. Subsequently the outer sheath is post cured by heating the sheathed tape in an oven for 1 to 8 hours, preferably 2 hours, at 100° to 200° C., preferably 150° C., and then increasing the temperature to 150° to 250° C., for a further 1 to 8 hours, preferably 2 hours. The tape is then allowed to stand for about one week. The above procedures whilst not essential are preferable as they increase the conductivity of the material.

Whilst the above is the preferred annealing procedure in the case of a heating tape if desired other procedures may be adopted. For example, the material may be annealed at a temperature lying in the range 100° C. to 200° C. for at least six hours and preferably between eight to twelve hours. The annealing operation may be performed cyclically, for example, by heating to a temperature in the above mentioned range for a period of time, for example, two hours, permitting the material to cool and then re-heating and repeating the cycle for 4 or 5 times.

The amount of annealing requird varies with the additives, the more additives present the more annealing being required. The annealing operation increases the conductivity compared with that which would be achieved without annealing. If desired, for example, when the material is used as a heating tape the material may be permitted to self-anneal, with the current on.

In the case of a heating tape it is preferred to provide a more highly conductive layer around the wires than for the remainder of the tape. For example, a rubber such as ICI silicone E303 containing 12½% by weight of Ketjenblack EC based on the weight of rubber, and 4% Dicup 40C based on the weight of rubber is extruded as a thin film to cover the wires. The thus covered wires are then utilised in a further extrusion operation in which the rubber of the main body of the tape is extruded thereon. The main body of the tape may be made from rubber of any of the compositions described hereinbefore. Subsequently, an outer sheath of non-conducting silicone rubber is applied.

BRIEF DESCRIPTION OF THE DRAWINGS

The FIGURE is a graph of the ratios of the operating resistance $R_o$ to the initial resistance $R_i$ plotted against days of continuous operation.

DESCRIPTION OF THE PREFERRED EMBODIMENTS

In one example a silicone rubber composition embodying the invention is utilized in a heating tape. The heating tape is 15 mm wide and 2.4 mm thick and is of indefinite length and comprises a pair of spaced parallel wire electrodes. The wires were then covered with conducting rubber to form the main body of the tape again in a conventional extrusion operation. The rubber of the main body of the tape comprises Dow Corning Limited rubbers Q41602 and X41638 in the ratio of 50/50 4% catalyst B (based on the weight of rubber). Q41602 as supplied by Dow Corning Limited contains Shawinigan carbon black. It contains about 55% by weight of carbon black and as we add 50% of X41638, which contains no carbon black, the carbon content of the rubber was 17.75% (based on the weight of rubber). The rubber also contained 100% British Titan products RTC-2 titanium dioxide additive (based on the weight of rubber) having a particle size lying in the range 0.1 to 5 microns. In terms of total material weight, the composition was carbon 8.7%, silicone gum 40.3%, catalyst B 2.0%, titanium dioxide 49%.

The heating tape was then post cured by heating in an oven for 2 hours at 150° C. and then increasing the temperature to 250° C. for a further 2 hours.

An outer sheath of ICI E315/50 silicone rubber including appropriate additives and catalyst was applied to the tape in a conventional extrusion operation and the tape was heated to 300° C. for 3 minutes to cure the outer sheath. Subsequently the outer sheath was post cured by heating the sheathed tape in an oven for 2 hours at 150° C. and then increasing the temperature to 250° C. for a further one to two hours.

The tape was allowed to stand for one week before being used.

The tape described hereinbefore was found to have the advantageous properties described hereinbefore and in particular was found to have an enhanced lifetime compared with the tape of the same construction and material but in which the silicone rubber of the body of the tape did not contain any compatible additive. The results of these comparison tests, which were performed by comparing the operating resistances of the two tapes initially and after passage of certain periods of time, are shown in FIG. 1 which is a graphical representation showing for the two tapes the ratio of the operating resistance $R_o$ to the initial resistance $R_i$ plotted against the number of days of continuous operation at 240 volts. Tapes in both cases were of 4-5 watt/linear foot capacity. It will be seen from the graph that in the case of a tape made from a material embodying the invention the ratio of the operating resistance to the initial resistance was substantially constant over a period of 80 days whereas a tape not in accordance with the invention had a rapid rise in the resistance over a period of 50 days.

Table 1 shows how the resistance of the resistance of the first example varies with storage time. It will be seen that over a period of in excess of two years, there was relatively little decrease in resistance

TABLE 1

| Elapsed Time | Resistivity ($\times 10^3 \Omega$cm) |
|---|---|
| Initial Value | 19.1 |
| Value after 2 years 2 months | 13.3 |

Table 2 shows how the resistance of the composition of this example varies with temperature. It will be seen that there is a significant non-linear PTC such that the ratio of the resistance at 105° C. to that at 35° C. is 14,317. Thus the ratio of the resistance at 150° C. to that at 20° C. is in excess of 300. It will be noted that there is no very sharp increase in resistance at a particular temperature but that effectively, i.e. for normal operating voltages such as 240 volts, the composition is non-conductive at temperatures in excess of about 94° C. and hence is effectively non-conductive at 150° C.

TABLE 2

| Temperature (°C.) | Resistivity ($\times 10^3 \Omega$cm) |
|---|---|
| 19 | 12.3 |
| 22 | 14.9 |
| 35 | 22.7 |
| 46 | 38.9 |
| 56 | 77.9 |
| 65 | 195 |
| 74 | 454 |
| 84 | 1,300 |
| 94 | 13,000 |
| 99 | 64,900 |
| 105 | 325,000 |

Table 3 shows the switch-on and operating currents and the ratio thereof in respect of this example when tested at 20° C.

TABLE 3

| Operating Current (mA) | Switch-on Current (mA) | Ratio |
|---|---|---|
| 25 | 110 | 4.4 |

In a second example a tape was made as in the first example but in this case the additive was 75% of Iron Oxide (based on the weight of rubber). Table 4 shows how the resistance of the composition of the second example varies with storage time. It will be seen that over approximately a three year period there was relatively little increase in the resistance.

TABLE 4

| Elapsed Time | Resistivity ($\times 10^3 \Omega$cm) |
|---|---|
| Initial Value | 9.74 |
| Value after 2 years 11 months | 6.35 |

It was found that, in use, the resistance of the composition of the example increased by 8% after 40 days of operation. This is significantly less change than the "no additive" sample shown in FIG. 1.

Table 5 shows how the resistance of the composition of this example varies with temperature. It will be seen that there is a significant non-linear PTC such that the ratio of the resistance at 150° C. to that at 25° C. is 4,995. Thus the ratio of the resistance at 150° C. to that at 20° C. is in excess of 300. It will be noted that there is no very sharp increase in resistance at a particular temperature but that effectively, i.e. for normal operating voltages such as 240 volts, the composition is non-conductive at temperatures in excess of about 143° C. and hence is effectively non-conductive at 150° C.

TABLE 5

| Temperature (°C.) | Resistivity (× $10^3 \Omega cm$) |
|---|---|
| 19 | 6.49 |
| 25 | 9.09 |
| 35 | 13 |
| 44 | 19.5 |
| 57 | 32.5 |
| 67 | 45.4 |
| 75 | 58.4 |
| 86 | 97.4 |
| 96 | 162 |
| 107 | 325 |
| 116 | 519 |
| 127 | 1,300 |
| 135 | 3,250 |
| 143 | 13,000 |
| 150 | 45,400 |

Table 6 shows the switch-on and operating currents and the ratio thereof in respect of this example when tested at 20° C.

TABLE 6

| Operating Current (mA) | Switch-on Current (mA) | Ratio |
|---|---|---|
| 50 | 155 | 3.1 |

In a third example a tape was made as in the first example but in this case the rubber was ICI E315/50 rubber and the additive was 75% of Iron Oxide (based on the weight of rubber). Table 7 shows how the resistance of the composition of the third example varies with storage time. It will be seen that in just under two month (51 day) period there was relatively little decrease in resistance.

TABLE 7

| Elapsed Time | Resistivity (× $10^3 \Omega cm$) |
|---|---|
| Initial Value | 67.9 |
| Value after 2 days | 61.7 |
| Value after 7 days | 55.2 |
| Value after 10 days | 51.9 |
| Value after 21 days | 53.2 |
| Value after 31 days | 50.6 |
| Value after 51 days | 51.3 |

It was found that, in use, the resistance of the composition of the example increased by 1½% after 90 days of operation. This is significantly less change than the "no additive" sample shown in FIG. 1.

Table 8 shows how the resistance of this material varies with temperature. It will be seen that there is a significant non-linear PTC such that the ratio of the resistance at 145° C. to that at 25° C. is 12,481. Thus the ratio of the resistance at 150° C. to that at 20° C. is in excess of 300. It will be noted that there is no very sharp increase in resistance at a particular temperature but that effectively, i.e. for normal operating voltages such as 240 volts, the composition is non-conductive at temperatures in excess of about 125° C. and hence is effectively non-conductive at 150° C.

TABLE 8

| Temperature (°C.) | Resistivity (× $10^3 \Omega cm$) |
|---|---|
| 18 | 8.76 |
| 25 | 10.4 |
| 32 | 13.0 |
| 44 | 22.7 |
| 55 | 38.9 |
| 62 | 64.9 |
| 67 | 97.4 |
| 76 | 135 |
| 81 | 325 |
| 90 | 649 |
| 99 | 1,300 |
| 110 | 3,250 |
| 120 | 7,790 |
| 131 | 32,450 |
| 139 | 64,900 |
| 145 | 129,800 |
| 155 | 324,500 |

Table 9 shows the switch-on and operating currents and the ratio thereof in respect of this example when tested at 20° C.

TABLE 9

| Operating Currents (mA) | Switch-on Currents (mA) | Ratio |
|---|---|---|
| 25 | 59 | 2.4 |

In a fourth example a tape was made as in the third example but in this case the additive was 100% silica (Minusil) (based on the weight of rubber).

Table 10 shows how the resistance of the composition of the fourth example varies with storage time. It will be seen that over a 3 month period there was relatively little decrease in resistance.

TABLE 10

| Elapsed Time | Resistivity (× $10^3 \Omega cm$) |
|---|---|
| Initial value | 27.3 |
| Value after 96 days | 18.5 |

It was found that, in use, the resistance of the composition of the example decreased by 1.2% after 65 days of operation. This is significantly less change than the "no additive" sample shown in FIG. 1.

Table 11 shows how the resistance of this material varies with temperature. It will be seen that there is a significant non-linear PTC such that the ratio of the resistance at 150° C. to that at 21° C. is 334. Thus the ratio of the resistance at 150° C. to that at 20° C. is in excess of 300. It will be noted that there is no very sharp increase in resistance at a particular temperature but that effectively, i.e. for normal operating voltages such as 240 volts, the composition is non-conductive at temperatures in excess of about 150° C. and hence is effectively non-conductive at 150° C.

TABLE 11

| Temperature (°C.) | Resistivity (× $10^3 \Omega cm$) |
|---|---|
| 21° | 38.9 |
| 25 | 42.2 |

TABLE 11-continued

| Temperature (°C.) | Resistivity (× 10³Ωcm) |
|---|---|
| 34 | 51.9 |
| 45 | 64.9 |
| 55 | 90.9 |
| 65 | 130 |
| 74 | 195 |
| 82 | 260 |
| 95 | 389 |
| 104 | 519 |
| 115 | 779 |
| 124 | 1,170 |
| 133 | 1,950 |
| 140 | 3,250 |
| 150 | 13,000. |

Table 12 shows the switch-on and operating currents and the ratio thereof in respect of this example when tested at 20° C.

TABLE 12

| Operating Current (mA) | Switch-on Current (mA) | Ratio |
|---|---|---|
| 33 | 80 | 2.4 |

In a fifth example the tape is made by initially covering the wires with a thin film of highly conductive silicone rubber by means of a conventional extrusion operation. The highly conductive rubber of the thin film which was 0.15 mm thick, comprised ICI silicone rubber E303 containing from 8 to 12½%, in this example 12½%, by weight of Ketjenblack EC (based on the weight of rubber) and 4% Dicup 40C (based on the weight of rubber).

The thus coated wires were then embedded in conducting silicone rubber to form the main body of the tape in a conventional extrusion operation. The rubber of the main body of the tape comprised ICI E303 rubber containing 20% of Shawinigan carbon black (based on the weight of rubber) and 4% Dicup 40C (based on the weight of rubber) made by Hercules Powder Company together with 100% of British Titan Products RTC-2 titanium dioxide additive (based on the weight of rubber). The same curing and sheath application operations were performed as described in connection with the first example.

It will be noted that the percentage by weight of carbon black in the higher conductivity region around the electrodes is less than that in the main body of the tape, the higher conductivity of the rubber in the region around the electrodes being achieved due to the properties of the Ketjenblack EC.

Table 13 shows how the resistance of the composition of the fifth example varies with storage time. It will be seen that over approximately a two year period there was relatively little increase in the resistance.

TABLE 13

| Elapsed Time | Resistivity (× 10³Ωcm) |
|---|---|
| Initial value | 12.4 |
| Value after 2 years 2 months | 9.7 |

It was found that, in use, the resistance of the composition of the example increased by 15% after 75 days of operation. This is significantly less change than the "no additive" sample shown in FIG. 1.

Table 14 shows how the resistance of the composition of this example varies with temperature. It will be seen that there is a significant non-linear PTC such that the ratio of the resistance at 104° C. to that at 21° C. is 31,300. Thus the ratio of the resistance at 150° C. to that at 20° C. is in excess of 300. It will be noted that there is no very sharp increase in resistance at a particular temperature but that effectively, i.e. for normal operating voltages such as 240 volts, the composition is non-conductive at temperatures in excess of about 95° C. and hence is effectively non-conductive at 150° C.

TABLE 14

| Temperature (°C.) | Resistivity (× 10³Ωcm) |
|---|---|
| 21 | 9.8 |
| 33 | 16.1 |
| 44 | 29.3 |
| 53 | 57.9 |
| 64 | 153 |
| 75 | 380 |
| 83 | 1,070 |
| 93 | 11,500 |
| 98 | 57,700 |
| 104 | 307,000 |

Table 15 shows the switch-on and operating currents and the ratio thereof in respect of this example when tested at 20° C.

TABLE 15

| Operating Current (mA) | Switch-on Current (mA) | Ratio |
|---|---|---|
| 21 | 89 | 4.2 |

By way of comparison, tests were performed on E315/50 silicone rubber not containing additive and Table 16 shows how the resistance varies with time and it will be noted that there is a significant decrease in resistance over a period of approximately three months, in fact a 71% reduction which is considerably greater than the percentage changes of 30% in over two years (Example 1); 35% in about 3 years (Example 2); 24% in just under two months (Example 3); and 32% in 3 months (Example 4); and 22% in about 2 years (Example 5) achieved with the compositions embodying the present invention.

TABLE 16

| Elapsed Time | Resistivity (× 10³Ωcm) |
|---|---|
| Initial value | 28.6 |
| Value after 2 days | 16.8 |
| Value after 9 days | 11.9 |
| Value after 16 days | 10.6 |
| Value after 28 days | 9.5 |
| Value after 35 days | 8.7 |
| Value after 41 days | 8.5 |
| Value after 55 days | 8.7 |
| Value after 63 days | 8.2 |

Table 17 shows how the resistance of this comparison material varies with temperature and it will be noted that the resistance varies in a manner comparable with that of materials embodying the present invention. This table demonstrates that the positive temperature coefficient characteristics of material embodying the present invention are not significantly detracted from by the presence of the additive.

TABLE 17

| Temperature (°C.) | Resistivity (× 10³Ωcm) |
|---|---|
| 20 | 18.2 |
| 26 | 20.1 |
| 36 | 33.5 |
| 47 | 64.9 |
| 51 | 130 |
| 67 | 260 |
| 76 | 649 |
| 86 | 1,622 |
| 91 | 6,490 |
| 97 | 32,500 |
| 100 | 64,900 |
| 105 | 340,000. |

Table 18 shows the switch-on and operating currents and the ratio thereof in respect of non-additive containing examples of varying carbon black content when tested at 20° C.

TABLE 18

| Operating Current (mA) | Switch-on Current (mA) | Ratio |
|---|---|---|
| 1. 26 | 140 | 5.4 |
| 2. 33 | 190 | 5.8 |
| 3. 49 | 280 | 5.7 |

This table demonstrates that the ratio of the switch-on current to the operating current is significantly less in the case of the material embodying the present invention compared with the comparison material as can be seen by comparing the values given in line 1 of Table 18 with values given in Tables 3, 9 and 15, the values given in line 2 of Table 18 with the values given in Table 12, the values given in line 3 of Table 18 to the values given in Table 6.

Table 19 shows the percentage improvement in the ratio of switch-on current to operating current achieved with materials in accordance with the invention compared with the comparison material. It will be noted that in the case of the first and fifth Examples, there is approximately a 20% improvement whilst in the other Examples, there is approximately a 50% improvement; that is to say, that in the case of material embodying the invention for a given operating current, the switch-on current will be approximately one half that which occurs with the comparison material.

TABLE 19

| Comparison | % Improvement |
|---|---|
| Table 3 - Line 1 | 19 |
| Table 6 - Line 3 | 46 |
| Table 9 - Line 1 | 56 |
| Table 12 - Line 2 | 59 |
| Table 15 - Line 1 | 22 |

As can be seen from all the above examples the conductivity of a material embodying the invention decreases slightly with increasing temperature but is reasonably stable in practical terms in the normal working range of silicone rubber. The material becomes effectively non-conducting at a temperature of between 94° C. and 150° C., depending upon the precise composition of the material but in all cases, the material is effectively non-conducting at 150° C. On cooling, the material recovers its conductivity and the cycle can be repeated. Furthermore, the conductivity of the material when used for heating is maintained for a longer period than for a rubber without additives in the range of the present invention.

An outer non-conducting sheath may be easily and conveniently applied to the tape by extrusion, as a result of the increased stiffness of the tape caused by the presence of the additives: the cost of producing the tape is reduced compared with the cost which would be encountered if pure silicone rubber were used due to the reduction in cost of the rubber occasioned by the presence of the additives.

A silicone rubber composition embodying the invention has the advantage of a lower overall material cost, an improved lifetime when used, for example, as a heating tape, is easier to extrude; has a stable conductivity during mixing, maintains dimensional integrity during use, has flame retardent properties, can be moulded, pressed, sheated, calendered, extruded or subjected to any other process use in conventional rubber manufacture and there is no significant loss of flexibility.

Although a tape having two electrodes has been described hereinbefore as being an example of an application of a material embodying the invention, the material may be employed in other articles including a tape or sheet having only one electrode, the current path being provided by placing the article on a conducting support. Or the article may include more than two electrodes, for example, three electrodes if it is a tape to be used with a three phase supply. Alternatively the article may be in the form of a sheet or mat and having a large number of electrodes.

In the specification when "weight of rubber" is referred to we mean the total weight of the rubber material specified and if the rubber material specified includes additives we mean the total weight of the rubber, i.e. the weight of the pure gum plus the additives. When "weight of silicone gum" is referred to, we mean the weight of the pure gum component of the material excluding any additives if additives are present in the material referred to.

We claim:

1. An electrically conductive silicone rubber composition having a positive, non-linear, temperature co-efficient of resistance which is substantially nonconductive at a temperature above a predetermined transition temperature lying in the range 94° C. to 150° C., the composition comprising 5% to 25% based on total weight of conducting carbon black, from 29% to 62% based on total material weight at least one additive selected from the group consisting of titanium dioxide, silica, zinc oxide, precipitated calcium carbonate, aluminium oxide, barium titanate, copper, aluminium, nickel, iron, having a particle size between 0.005 microns and 100 microns, and having a melting point above the curing temperature of the rubber, and said at least one additive being compatible with said rubber by virtue of said additive particles being wetted by the uncured silicone rubber, the cohesive energy between said silicone rubber and said particles being greater than that between particles, and said additive not affecting the curing of said rubber.

2. A rubber composition according to claim 1 wherein there is up to 14% of carbon black based on total material weight.

3. A rubber composition according to claim 1 wherein there is up to 8.7% of carbon black based on total material weight.

4. A rubber composition according to claim 1 wherein the additive particle size is between 0.01 microns and 10 microns.

5. A rubber composition according to claim 1 wherein the additive is non-electrically conductive.

6. A rubber composition according to claim 1 wherein the additive comprises a powdered metal.

7. A rubber composition according to claim 1 wherein the rubber contains at least 35% of at least one additive, based on total material weight.

8. A rubber composition according to claim 1 wherein the rubber contains between 40% and 55% of at least one additive based on total material weight.

9. A rubber composition according to claim 1 wherein ratio of the electrical conductivity of the composition at 150° C. to that at 20° C. is at least 300.

10. A rubber composition according to claim 1 wherein the ratio of the switch-on current to the operating current is not more than 4.4

11. An electrically conductive silicone rubber composition having a positive non-linear, temperature coefficient of resistance and which is substantially non-conductive at a temperature above a predetermined transition temperature lying in the range 94° C. to 150° C. the composition comprising from 5% to 25% based on total material weight of conducting carbon black, from 40% to 55% of at least one additive selected from the group consisting of titanium dioxide, silica, zinc oxide, precipitated calcium carbonate, aluminium oxide, barium titanate, copper, aluminium, nickel, iron and having a particle size between 0.005 microns and 100 microns, the ratio of the resistivity of the material at 150° C. to that at 20° C. being at least 300 and the ratio of the switch-on current to the operating current being not more than 4.4.

* * * * *